United States Patent
Han et al.

(10) Patent No.: US 9,883,077 B2
(45) Date of Patent: Jan. 30, 2018

(54) IMAGE FORMING APPARATUS AND METHOD OF MANAGING INFORMATION THEREOF

(75) Inventors: Chang-min Han, Suwon-Si (KR); Hyung-ho Lee, Suwon-si (KR); Ki-hun Kim, Suwon-si (KR); Jin-ah Heo, Suwon si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 13/534,184

(22) Filed: Jun. 27, 2012

(65) Prior Publication Data

US 2013/0044352 A1 Feb. 21, 2013

(30) Foreign Application Priority Data

Aug. 18, 2011 (KR) ........................ 10-2011-0082463

(51) Int. Cl.
 *H04N 1/44* (2006.01)
 *G06F 21/60* (2013.01)
 *G06F 3/12* (2006.01)

(52) U.S. Cl.
 CPC ......... *H04N 1/4406* (2013.01); *G06F 21/608* (2013.01); *G06F 3/1222* (2013.01); *G06F 3/1273* (2013.01); *G06F 2221/2143* (2013.01)

(58) Field of Classification Search
 CPC .............. G06F 3/1274; H04N 1/00838; H04N 2201/3295
 USPC ........... 358/1.15, 1.14, 1.9; 705/51, 57, 405; 707/662, 692
 See application file for complete search history.

(56) References Cited

U.S. PATENT DOCUMENTS

| 5,884,122 A * | 3/1999 | Kawabuchi et al. ........... 399/88 |
| 5,999,766 A * | 12/1999 | Hisatomi et al. .............. 399/80 |
| 2005/0183141 A1* | 8/2005 | Sawada .................. G03G 21/04 726/16 |
| 2005/0257275 A1* | 11/2005 | Ooba ................. H04N 1/00854 726/28 |
| 2006/0101078 A1* | 5/2006 | Tashiro ............... G06F 21/6245 |
| 2007/0044020 A1 | 2/2007 | Iwatsu et al. |
| 2007/0073628 A1* | 3/2007 | Pauly et al. .................... 705/62 |
| 2008/0259399 A1* | 10/2008 | Wada .......................... 358/1.15 |
| 2009/0051956 A1 | 2/2009 | Kondo |

(Continued)

FOREIGN PATENT DOCUMENTS

| JP | 04183175 | 6/1992 |
| JP | 2005085148 | 3/2005 |
| JP | 2005236782 | 9/2005 |

OTHER PUBLICATIONS

Extended European Search Report dated Nov. 23, 2012 issued in EP Application No. 12176921.0.

(Continued)

*Primary Examiner* — Thomas Lett

(74) *Attorney, Agent, or Firm* — Staas & Halsey LLP

(57) ABSTRACT

An electronic apparatus includes a job processor to perform a job of the image forming apparatus, a storage unit to store apparatus use information on a user of the image forming apparatus and job performance of the job processor, a determination unit to determine whether the user is changed or not, and a controller to delete the apparatus use information on a previous user if it is determined that the user is changed.

17 Claims, 8 Drawing Sheets

(56) References Cited

U.S. PATENT DOCUMENTS

2010/0007907 A1* 1/2010 Aikens .................. G06F 3/1207
                                                    358/1.14
2010/0306070 A1* 12/2010 Tabuchi et al. ................. 705/18
2012/0054855 A1* 3/2012 Shimizu .......................... 726/19

OTHER PUBLICATIONS

European Office Action dated May 13, 2016 in corresponding European Patent Application No. 12 176 921.0.
Korean Office Action dated Apr. 25, 2017 in corresponding Korean Patent Application No. 10-2011-0082463 (6 pages) (4 pages English Translation).
Summons to attend Oral Proceedings dated Mar. 2, 2017 in related European Patent Application No. 12176921.0 (6 pages).

* cited by examiner

IMAGE FORMING APPARATUS AND METHOD OF MANAGING INFORMATION THEREOF

CROSS-REFERENCE TO RELATED APPLICATIONS

This application claims the benefit under 35 U.S.C. § 119 from Korean Patent Application No. 10-2011-0082463, filed on Aug. 18, 2011, in the Korean Intellectual Property Office, the disclosure of which is incorporated herein by reference in its entirety.

BACKGROUND OF THE INVENTION

1. Field of the Invention

The present general inventive concept generally relates to an image forming apparatus and a method of managing information thereof, and more particularly, to an image forming apparatus which can manage apparatus use information on a user and job performance of the image forming apparatus, and a method of managing information thereof.

2. Description of the Related Art

An image forming apparatus refers to an apparatus that prints printing data generated from a terminal apparatus, such as a computer, on recording paper. Examples of such an image forming apparatus are a copier, a printer, a facsimile machine, or a multifunction peripheral (MFP), which complexly realizes two or more functions of the aforementioned devices in a single device.

Currently, leasing services of printers or MFPs are increasingly being offered. Accordingly, personal information (account information) and use information (information transmitted or received) of existing users are very likely to be exposed to a new user. Therefore, there is an increasing need for protection of the personal information and use information in a leased printer or MFP.

However, some information may be deleted by the user when the leased printer or MPF is returned, but some information, such as use information, cannot be deleted and thus there is a problem in that the user cannot delete information even though the user recognizes the information.

Also, if a complicated process is required to delete the information, the user may not delete the information. That is, in a case that there are personal information and/or user information that can be deleted by the complicated process, a user or an administrator should find pieces of information one by one and thus may omit to delete some piece of information.

Therefore, the information that the user does not delete may be leaked.

Also, when a leasing period expires, an existing user may return a product without deleting information. In this case, there is a problem in that personal information and user information are leaked.

SUMMARY OF THE INVENTION

The present general inventive concept provides an image forming apparatus which can protect information on an existing user, if the user is changed for some reason such as leasing, and a method of managing apparatus use information thereof.

The present general inventive concept also provides an image forming apparatus which provides a user interface (UI) through which a user can easily manage apparatus use information, and a method for managing apparatus use information thereof.

Additional embodiments of the present general inventive concept will be set forth in part in the description which follows and, in part, will be obvious from the description, or may be learned by practice of the general inventive concept.

The foregoing and/or other features and utilities of the present general inventive concept may be achieved by providing an image forming apparatus including a job processor to perform a job of the image forming apparatus, a storage unit to store apparatus use information on a user of the image forming apparatus and job performance of the job processor, a determination unit to determine whether the user is changed or not, and a controller to delete the apparatus use information on a previous user if it is determined that the user is changed.

The apparatus use information may include at least one of an IP, an apparatus name, an identification number, an account ID, an account password, an address book, a document box, a mail box, a poll, a fax transmission-reception record, a job log, an operation log, a fax transmission image TCR, and latest use information of the image forming apparatus.

If a plug of the image forming apparatus is reconnected to electricity supply after being disconnected from the electricity supply and the image forming apparatus is turned on, the determination unit may determine that the user is changed.

The image forming apparatus may further include a user interface unit, and, if new apparatus use information is input through the user interface unit, the controller may additionally store the new apparatus use information in the storage unit.

The determination unit may compare the apparatus use information stored in the storage unit and the new apparatus use information, and, if at least one of an IP, an apparatus name, an identification number, an account ID, and an account password of the image forming apparatus is changed, the determination unit may determine that the user is changed.

The image forming apparatus may further include a user interface unit to display a UI window to ask whether the apparatus use information will be deleted, if it is determined that the user is changed, and, if a command to delete the apparatus use information is input through the UI window, the controller may delete the apparatus use information, and, if deletion of the apparatus use information is rejected on the UI window or if the command to delete is not input, the controller may maintain the apparatus use information.

The image forming apparatus may further include a user interface unit to display a UI window to ask whether the apparatus use information will be deleted, if it is determined that the user is changed, and, if a command to delete the apparatus use information is input through the UI window, the controller may delete the apparatus use information, if deletion of the apparatus use information is rejected on the UI window or if the command to delete is not input, the controller may display a user identification UI window to receive an account ID and a password on the user interface unit, and, if an account ID and a password input through the user identification UI window are identical to an existing account ID and an existing password, the controller may maintain the apparatus use information, and if not, may delete the apparatus use information.

The image forming apparatus may further include a user interface unit to display an item selection UI window including items of the apparatus use information, if it is determined that the user is changed, and the controller may delete apparatus use information of an item selected on the item selection UI window.

The storage unit may include at least one storage medium, and the image forming apparatus may further include a user interface unit to display a storage medium selection UI window including information on at least one storage medium, if it is determined that the user is changed, and the controller may format a storage medium selected on the storage medium selection UI window.

The image forming apparatus may further include a user interface unit to receive a command to delete the apparatus use information, and, if the command to delete is input, the controller deletes the apparatus use information regardless of whether the user is changed or not.

The user interface unit may display an item selection UI window including items of the apparatus use information, if the command to delete is input, and the controller may delete apparatus use information of an item selected on the item selection UI window.

The storage unit may include at least one storage medium. If the command to delete is input, the user interface unit may display a storage medium selection UI window including information on the at least one storage medium, and the controller may format a storage medium selected on the storage medium selection UI window.

The foregoing and/or other features and utilities of the present general inventive concept may also be achieved by providing a method of managing information of an image forming apparatus, the method including performing an image forming job, storing apparatus use information on a user of the image forming apparatus and performance of the image forming job, determining whether the user is changed or not, and, if it is determined that the user is changed, deleting the apparatus use information on a previous user.

The apparatus use information may include at least one of an IP, an apparatus name, an identification number, an account ID, an account password, an address book, a document box, a mail box, a poll, a fax transmission-reception record, a job log, an operation log, a fax transmission image TCR, and latest use information of the image forming apparatus.

The determining may include, if a plug of the image forming apparatus is reconnected to electricity supply after being disconnected from the electricity supply and the image forming apparatus is turned on, determining that the user is changed.

The method may further include, if new apparatus use information is input, additionally storing the new apparatus use information in a storage unit which stores the apparatus use information.

The determining may include comparing the apparatus use information and the new apparatus use information, and, if at least one of an IP, an apparatus name, an identification number, an account ID, and an account password of the image forming apparatus is changed, determining that the user is changed.

The deleting the apparatus use information on the previous user may include, if it is determined that the user is changed, displaying a UI window to ask whether the apparatus use information will be deleted, if a command to delete the apparatus use information is input through the UI window, deleting the apparatus use information, and, if deletion of the apparatus use information is rejected on the UI window or if the command to delete is not input, maintaining the apparatus use information.

The deleting the apparatus use information on the previous user may include if it is determined that the user is changed, displaying a UI window to ask whether the apparatus use information will be deleted, if a command to delete the apparatus use information is input through the UI window, deleting the apparatus use information, if deletion of the apparatus use information is rejected on the UI window or if the command to delete is not input, displaying a user identification UI window to receive an account ID and a password, if an account ID and a password input through the user identification UI window are identical to an existing account ID and an existing password, maintaining the apparatus use information, and if the account ID and the password input through the user identification UI window are not identical to the existing account ID and the existing password, deleting the apparatus use information.

The deleting the apparatus use information on the previous user may include, if it is determined that the user is changed, displaying an item selection UI window including items of the apparatus use information; and deleting apparatus use information of an item selected on the item selection UI window.

The deleting the apparatus use information on the previous user may include, if it is determined that the user is changed, displaying a storage medium selection UI window including information on at least one storage medium, and formatting a storage medium selected through the storage medium selection UI window.

The method may further include: receiving a command to delete the apparatus use information, and, if the command to delete is input, deleting the apparatus use information regardless of whether the user is changed or not.

The deleting the apparatus use information regardless of whether the user is changed or not may include, if the command to delete is input, displaying an item selection UI window including items of the apparatus use information, and deleting apparatus use information of an item selected on the item selection UI window.

The deleting the apparatus use information regardless of whether the user is changed or not may include, if the command to delete is input, displaying a storage medium selection UI window including information on at least one storage medium, and formatting a storage medium selected on the storage medium selection UI window.

The foregoing and/or other features and utilities of the present general inventive concept may also be achieved by providing a computer-readable medium containing computer-readable codes as a program to execute a method of managing information of an image forming apparatus, the method including performing an image forming job, storing apparatus use information on a user of the image forming apparatus and performance of the image forming job, determining whether a user is changed, and, if it is determined that the user is changed, deleting the apparatus use information on a previous user.

The foregoing and/or other features and utilities of the present general inventive concept may also be achieved by providing an image forming apparatus including a job processor to perform a job of the image forming apparatus, a storage unit to store apparatus use information on a user of the image forming apparatus and job performance performed by the job processor, and a controller to delete the apparatus use information and the job performance in response to a determination of whether the user is changed.

The determination may include at least one of a first determination of whether a plug of the image forming apparatus is disconnected from and reconnected to power, a second determination of whether new user information of a new user of the image forming apparatus is not the same as user information of the user of the image forming apparatus, and a third determination of whether a command is input to delete the apparatus use information and the job performance.

The image forming apparatus may further include an interface unit to generate at least one of a first user interface window to correspond to whether a plug of the image forming apparatus is disconnected from and reconnected to power, a second user interface window to correspond to whether new user information of a new user of the image forming apparatus is not the same as user information of the user of the image forming apparatus, and a third user interface window to correspond to whether a command is input to delete the apparatus use information and the job performance.

The user may include a plurality of users sharing the image forming apparatus, and the control unit may delete the apparatus use information and the job performance according to selection of one of the users.

The user may include a plurality of users sharing the image forming apparatus, the storage unit may include one or more storage units, and the control unit may delete the apparatus use information and the job performance according to at least one of selection of one of the users and selection of one of the storage units.

BRIEF DESCRIPTION OF THE DRAWINGS

These and/or other embodiments of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
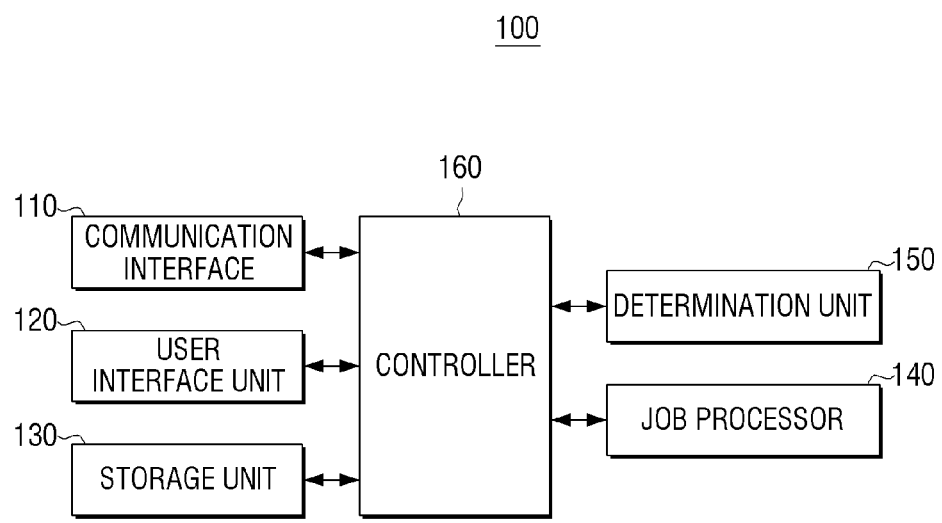
FIG. 1 is a block diagram illustrating an image forming apparatus according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating an image forming apparatus 100 according to an exemplary embodiment of the present general inventive concept. Referring to FIG. 1, the image forming apparatus 100 includes a communication interface 110, a user interface unit 120, a storage unit 130, a job processor 140, a determination unit 150, and a controller 160. The image forming apparatus 100 may be a scanner, a copier, a printer, a facsimile machine, and an MFP complexly realizing the functions of the aforementioned devices in a single device.

The communication interface 100 functions to connect the image forming apparatus 100 to an external apparatus such as a host apparatus, a terminal, a server, and a network.

The communication interface 110 may access in a wired or wireless manner through a local area network (LAN) and internet, and also, may access through a universal serial bus (USB) port.

The user interface unit 120 functions to allow a user to set or select various functions supported by the image forming apparatus 100.

The image forming apparatus 100 may receive new apparatus use information using the user interface unit 120. That is, if an existing user of the image forming apparatus 100 is replaced with a new user due to leasing of the image forming apparatus 100, for example, the image forming apparatus 100 may receive the new apparatus use information, such as an account ID and a password, an apparatus name, an identification number, and an internet protocol (IP) using the user interface unit 120.

Also, the user interface unit 120 may display a user interface (UI) window to ask whether the apparatus use information will be deleted. This will be explained in detail below with reference to FIG. 2.

If a command to reject deletion is input through the UI window in response to the question on whether the apparatus use information will be deleted or if a command to delete is not input, the user interface unit 120 may display a user identification UI window to receive an account ID and a password. This will be explained in detail below with reference to FIG. 3.

Also, the user interface unit 120 may display an item selection UI window including items of the apparatus use information. This will be explained in detail below with reference to FIG. 5.

The user interface unit 120 may display a storage medium selection UI window including information on at least one storage medium. This will be explained in detail below with reference to FIG. 4.

The user interface unit 120 may be realized by a device to simultaneously perform input and output, such as a touch pad, or may be realized by a device combining an input device, such as a mouse, and a keyboard and a display device, such as a CRT monitor, an LCD monitor, and an LED monitor.

The storage unit 130 functions to store various programs and data necessary to drive the image forming apparatus 100.

The storage unit 130 may store the apparatus use information on the user of the image forming apparatus 100 and job performance of the job processor 140, which will be described in detail below.

The apparatus use information may include at least one of an IP, an apparatus name, an identification number, an account ID, an account password, an address book, a document box, a mail box, a poll, a fax transmission-reception record, a job log, an operation log, a fax transmission image (transmission confirmation report (TCR)), and latest use information of the image forming apparatus 100.

The IP of the image forming apparatus 1100 refers to an address of at least one image forming apparatus connected to at least one external apparatus to discriminate the image forming apparatus from other image forming apparatuses in a network.

The apparatus name refers to a name given to the image forming apparatus 100 (for example, a name of a manufacturer (Samsung) and/or a printer model (scx-3205wk) or a name of the image forming apparatus 100 in a network (for example, IP Group 1 of Samsung DMC Department).

The identification number refers to a number assigned to the image forming apparatus 100 and is a number different from the IP. For example, the identification number may be a name that the user assigns to the image forming apparatus 100 as a number, and, if the image forming apparatus 100 has a fax function, the identification number may be a fax number.

The account ID and the account password refer to an ID and a password of the user to use the image forming apparatus 100.

The address book refers to information on addresses stored in the image forming apparatus 100.

The document box refers to a collection of documents received from an external apparatus and stored in the image forming apparatus 100 or pre-stored in the image forming apparatus 100. The document may include an image that can be formed or printed through the image forming apparatus 100.

The mail box refers to a collection of mail documents stored in the image forming apparatus 100.

If the image forming apparatus has a fax function, the poll refers to data that is requested from a fax transmitter by a fax receiver, who wishes to receive a fax, and is received at fax receiver's expense.

The fax transmission-reception record refers to a record on the fax transmitted or received through the image forming apparatus 100, if the image forming apparatus 100 has a fax function.

The job log refers to a record on the jobs performed by the image forming apparatus 100 such as printing, scanning, and faxing.

The operation log refers to a record on the operations of the image forming apparatus 100 controlled by the user through key input.

The fax transmission image TCR refers to information on the first document of documents faxed by the image forming apparatus 100, if the image forming apparatus 100 has a fax function.

The latest use information refers to information on the latest job performed by the user using the image forming apparatus 100.

As described above, the storage unit 130 may store the apparatus use information on the user of the image forming apparatus 100 and the job performance of the job processor 140, which will be described later.

Also, if new apparatus use information is input through the user interface unit 120, the storage unit 130 may store the new apparatus use information under control of the controller 160, which will be described later.

The storage unit 306 may include at least one storage medium. The storage medium may be a random access memory (RAM), a flash memory, a read only memory (ROM), an erasable programmable ROM (EPROM), an electronically erasable and programmable ROM (EEPROM), a register, a hard disk, a removable disk, a memory card, and an USB memory.

The job processor 140 performs an image forming job such as printing, scanning, copying, and faxing according to a control signal of the controller 160.

The determination unit 150 functions to determine whether the user of the image forming apparatus 100 is changed or not. That is, the determination unit 150 functions to determine whether the user is changed for some reason such as leasing of the image forming apparatus 100.

When a plug of the image forming apparatus 100 is disconnected from an electricity supply and then reconnected to the electricity supply so that the image forming apparatus 100 can be turned on, the determination unit 150 may determine that the user is changed. It is common that the user turns on or off a switch while using the image forming apparatus 100, but the user rarely disconnects the plug of the image forming apparatus 100 from the electricity supply and then reconnects the disconnected plug while using the image forming apparatus. Accordingly, in this case, the determination unit 150 determines that the user is changed and transmits a signal to inform the controller 160 that the user is changed. Here, the plug is connected to a power control unit (not illustrated) of the image forming apparatus 100 and also plugged into a terminal of the electricity supply to receive an external power from the terminal of the electricity supply and then supply the received power to the power control unit to generate an internal power to be used in units of the image forming apparatus 100. The switch is connected between the plug and at least one of the power control units and the units of the image forming apparatus 100 to control the internal power.

The determination unit 150 compares the apparatus use information stored in the storage unit 130 and the new apparatus use information, and, if at least one of the use information, such as the IP, the apparatus name, the identification number, the account ID, and the account password of the image forming apparatus 100, is changed, the determination unit 150 may determines that the user is changed. The user rarely changes the IP, the apparatus name, the identification number, the account ID, and the account password, while using the image forming apparatus 100, once they have been set. Accordingly, in this case, the determination unit 150 determines that the user is changed and transmits the signal to the controller 160 to inform that the user is changed.

The case that the user is changed includes a case that the user is changed as an existing user is replaced with a new user due to leasing (or termination or change of a leasing or use period) of the image forming apparatus 100 (that is, the user is changed as the image forming apparatus 100 is moved from a first place to a second place which requires disconnection and reconnection of the plus), and a case that the user is changed without a leasing change (that is, only the user is changed without moving the image forming apparatus). For example, in a managed printing and service or solution (MPS) system, which manages a log of a job (printing, copying, faxing, and/or scanning) of an image forming apparatus in a network and processes a business logic for an amount of data used on an individual or group basis and charging for the processed business logic, the image forming apparatus is not moved and only the user of the image forming apparatus in the network is changed.

However, since the case that the user is changed without a change or termination of leasing (that is, only the user is changed without moving the image forming apparatus) is the case that several users share at least one image forming apparatus, the plug may not be disconnected from the electricity supply and then reconnected to the electricity supply such that the image forming apparatus is maintained in a turned on state, and at least one of the IP, the apparatus name, the identification number, the account ID, and the account password of the image forming apparatus may not be changed. Thus, in this case, the determination unit 150 may not determine that the user is changed.

The controller 160 functions to control the communication interface 110, the user interface unit 120, the storage unit 130, the job processor 140, and the determination unit 150.

The controller 160 may control the communication interface 110 to exchange information with an external apparatus (not illustrated).

If the new apparatus use information is input through the user interface unit 120, the controller 160 may control the storage unit 130 to additionally store the new apparatus use information.

If the determination unit 150 determines that the user is changed, the controller 160 may control the storage unit 130 to delete the apparatus use information on a previous user. That is, if the determination unit 150 determines that the user is changed, the controller 160 may delete the apparatus use information on the previous user without asking a new user whether the previous or new user wants to delete the apparatus use information.

If the determination unit 150 determines that the user is changed, the controller 160 may control the user interface unit 120 to display the UI window to ask whether the apparatus use information will be deleted, the item selection UI window including the items of the apparatus use information displayed through the user interface unit 120, the user identification UI window to receive the account ID and the password, and the storage medium selection UI window including the information on at least one storage medium.

Also, if a command to delete the apparatus use information is input through the UI window, which is displayed by the user interface unit 120 to ask whether the apparatus use information will be deleted, the controller 160 may control the storage unit 130 to delete the apparatus use information, and, if the deletion of the apparatus use information is rejected on the UI window or if the command to delete is not input, the controller 160 may maintain the apparatus use information.

Also, if the command to delete the apparatus use information is input through the UI window, which is displayed by the user interface unit 120 to ask whether the apparatus use information will be deleted, the controller 160 may control the storage unit 130 to delete the apparatus use information, and if the deletion of the apparatus use information is rejected on the UI window or if the command to delete is not input, the controller 1160 may control the user interface unit 120 to display the user identification UI window to receive the account ID and the password. If the account ID and the password input through the user identification UI window are identical to the existing account ID and the existing password, the controller 160 may maintain the apparatus use information, and if not, the controller 160 may control the storage unit 130 to delete the apparatus use information.

The controller 160 may control the storage unit 130 to delete apparatus use information of an item that is selected through the item selection UI window displayed through the user interface unit 120 and including the items of the apparatus use information.

Also, the controller 160 may control the storage unit 130 to format a storage medium that is selected through the storage medium selection UI window displayed on the user interface unit 120 and including the information on the at least one storage medium of the storage unit 130.

If a command to delete is input through a deletion command UI window displayed through the user interface unit 120 regarding the apparatus use information, the controller 160 may control the storage unit 130 to delete the apparatus use information regardless of whether the user is changed or not.

FIGS. 2 through 5 are views illustrating a method of managing apparatus use information of an image forming apparatus according to an exemplary embodiment of the present general inventive concept. Hereinafter, an image forming apparatus according to an exemplary embodiment and a method of managing information thereof will be explained with reference to FIGS. 2 through 5.

Figure 2:
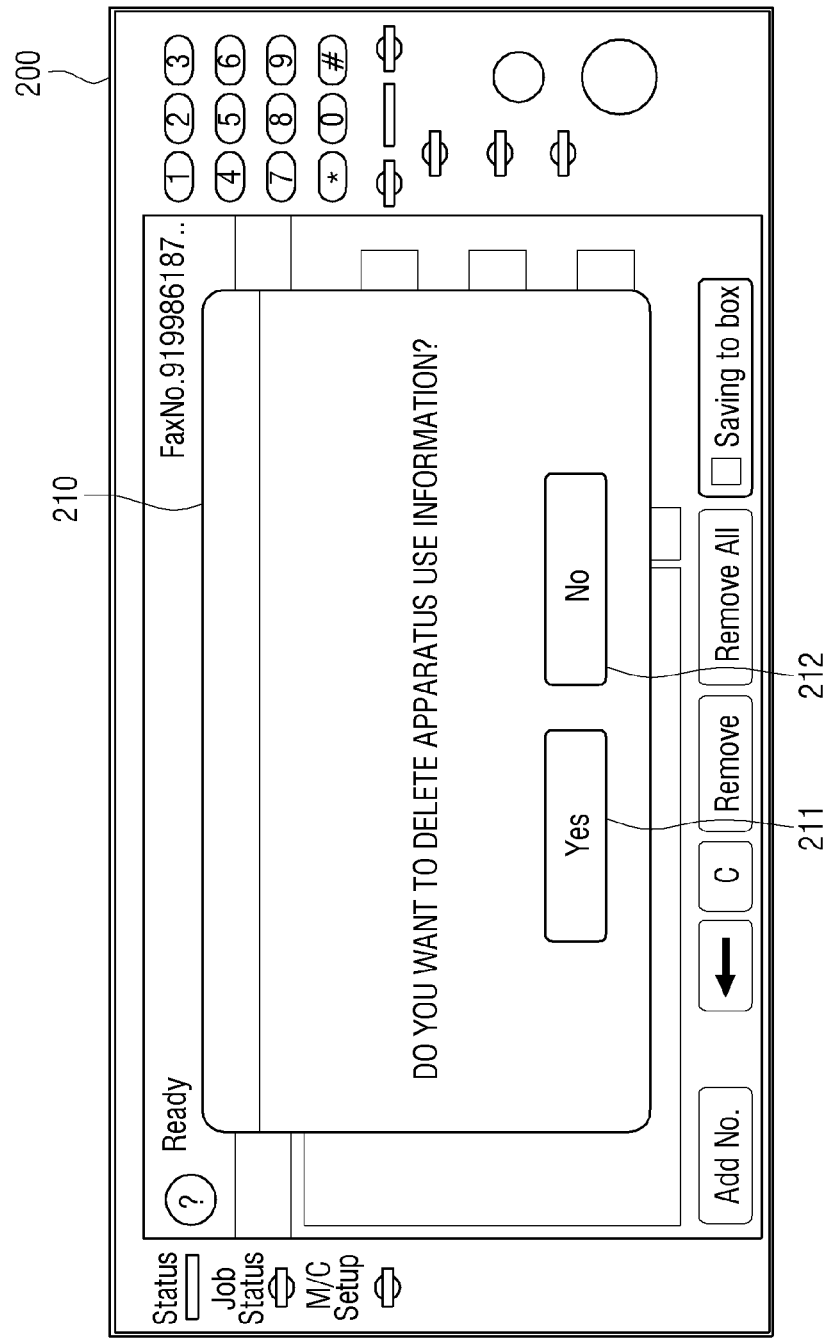
FIGS. 2 through 5 are views illustrating a method of managing apparatus use information of an image forming apparatus according to an exemplary embodiment of the present general inventive concept.

Referring to FIG. 2, a UI window 200 includes a UI window 210 to ask whether a user wants to delete apparatus use information or not and YES and NO selection UI windows 211 and 212 to answer the question on whether the user wants to delete the apparatus use information.

According to an exemplary embodiment, the image forming apparatus 100 determines whether a user is changed or not through the determination unit 150. If it is determined that the user is changed, the controller 160 may control the storage unit 130 to automatically delete the apparatus use information on a previous user. That is, the controller 160 may control the user interface unit 120 not to display the UI window 210 to ask whether the user wants to delete the apparatus use information as illustrated in FIG. 2, while controlling the storage unit 130 to delete the apparatus use information on a previous user, without asking a new user whether the user wants to delete the apparatus use information.

According to an exemplary embodiment, the image forming apparatus 100 determines whether a user is changed or not through the determination unit 150. If it is determined that the user is changed, the controller 160 may control the user interface unit 120 to display the UI window 210 to ask a new user whether the user wishes to delete the apparatus use information as illustrated in FIG. 2. If the YES selection UI window 211 in the UI window 210 is selected, the controller 160 may control the storage unit 130 to delete the apparatus use information on a previous user. If the NO selection UI window 212 in the UI window is selected, the controller 160 may control the storage unit 130 to maintain the apparatus use information on the previous user.

According to an exemplary embodiment, the image forming apparatus 100 determines whether a user is changed or not through the determination unit 150. If it is determined that the user is changed, the controller 160 may control the user interface unit 120 to display the UI window 210 to ask a new user whether the user wishes to delete the apparatus use information as shown in FIG. 2. If the YES selection UI window 211 in the UI window 210 is selected, the controller 160 may control the storage unit 120 to delete the apparatus use information on a previous user. If the NO selection UI window 212 in the UI window 210 is selected or if a command to delete is not input (that is, neither the YES selection UI window 211 nor the NO selection UI window 212 is selected), the controller 160 may control the user interface unit 120 to display a user identification UI window to receive an account ID and a password as illustrated in FIG. 3.

Figure 3:
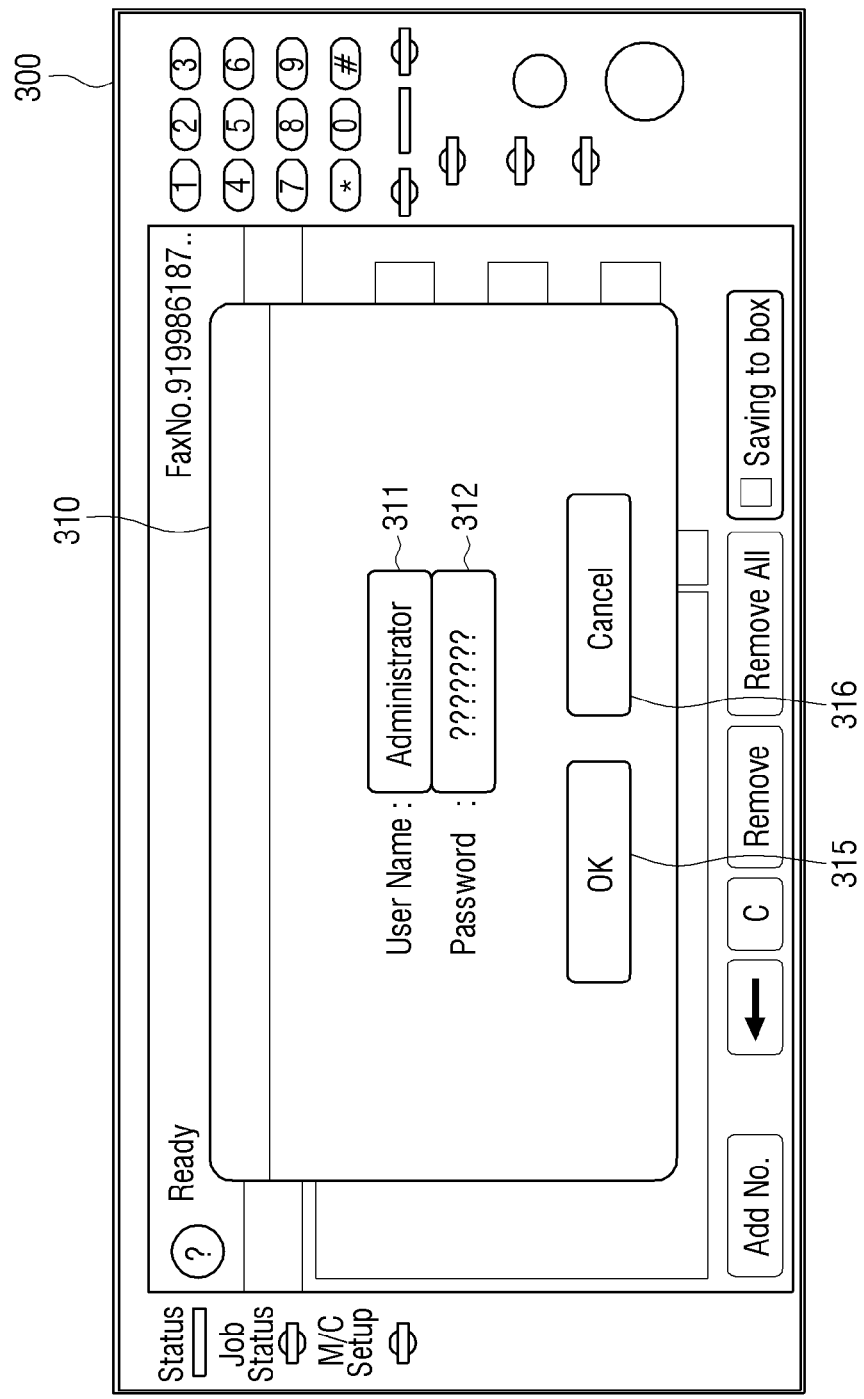

Referring to FIG. 3, a UI window 300 includes a user identification UI window 310 and OK and Cancel selection UI windows 315 and 316 regarding the user identification UI window 310. If an account ID and a password input through the user identification UI window 310 are identical to an existing account ID and an existing password, the controller 160 may control the storage unit 130 to maintain the apparatus use information on the previous user. If the account ID and the password input through the user identification UI window 310 are not identical to the existing account ID and the existing password, the controller 160 may control the storage unit 130 to delete the apparatus use information on the previous user.

That is, if the user is changed as an existing user is replaced with a new user due to leasing (that is, the user is changed as an image forming apparatus is changed or moved) or if the user is changed without leasing (that is, only the user is changed without moving the image forming apparatus), the new user may be given authority to use the apparatus use information by the existing user. In this case, if the account ID and the password input through the user identification UI window 310 are identical to the existing account ID and the password, the apparatus use information is maintained so that unreasonable measures to the new user can be prevented.

Also, according to an exemplary embodiment, the image forming apparatus 100 determines whether a user is changed or not through the determination unit 150. If it is determined that the user is changed, the controller 160 may control the user interface unit 120 to display a storage medium selection UI window including information on at least one storage medium as illustrated in FIG. 4.

Figure 4:
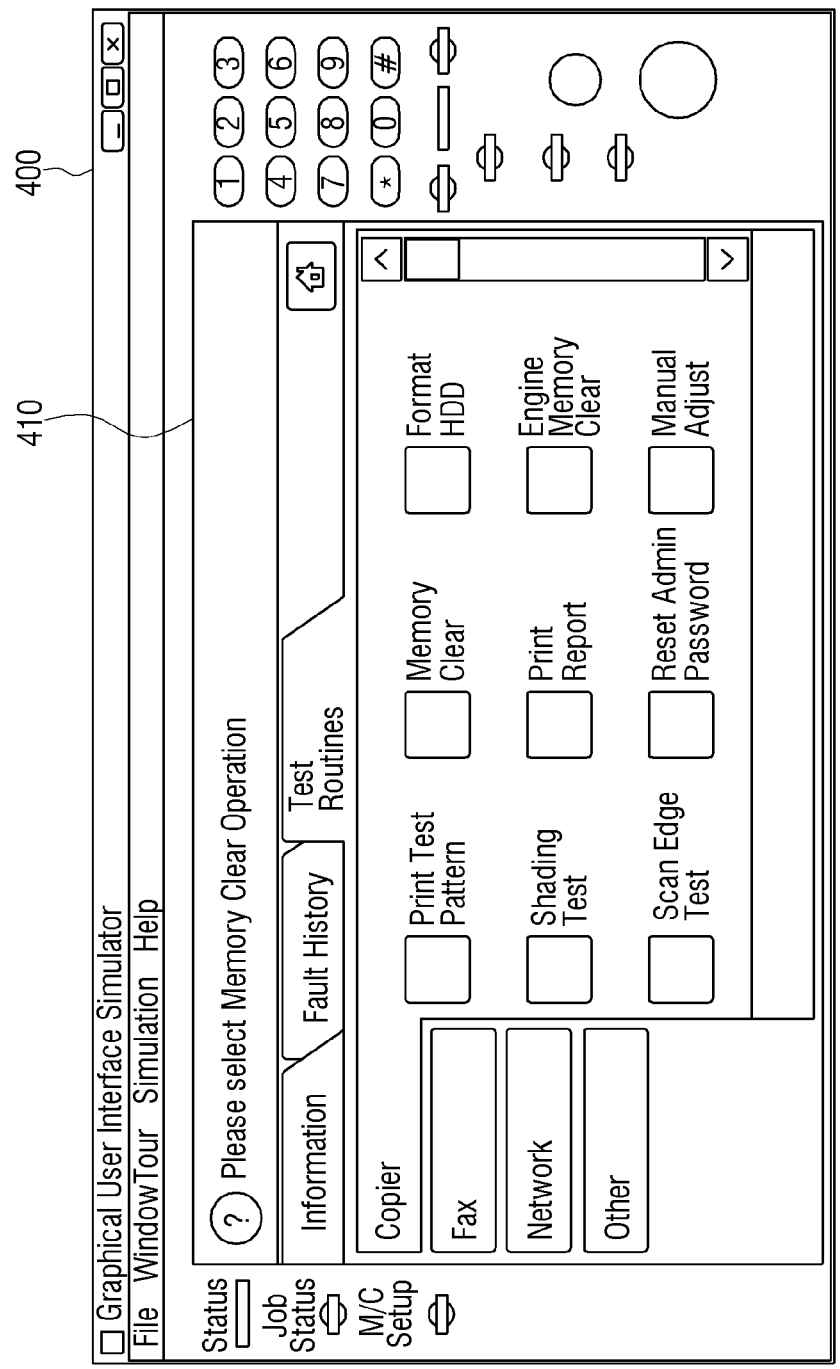

Referring to FIG. 4, a UI window 400 includes a storage medium selection UI window 410 including information on at least one storage medium. That is, an HDD, a memory, and an engine memory are illustrated as examples of the storage medium. If the user selects a storage medium through the storage medium selection UI window 410 including the information on the at least one storage medium, the controller 160 may control the storage unit 130 to format the selected storage medium.

The controller 160 may display the storage medium selection UI window 410 including the information on the at least one storage medium without displaying the UI window 210 to ask whether the user wants to delete the apparatus use information as illustrated in FIG. 2.

The controller 160 may control to display the UI window 210 to ask whether the user wishes to delete the apparatus use information as illustrated in FIG. 2, and, if the user selects the YES selection UI window 211 in the UI window 210, the controller 160 may display the storage medium selection UI window 410 including the information on the at least one storage medium. If the NO selection UI window 212 in the UI window 210 to ask whether the user wishes to delete the apparatus use information is selected, the controller 160 may control the storage unit 130 to maintain the apparatus use information on the previous user.

Also, if the account ID and the password input through the user identification UI window 310 illustrated in FIG. 3 are identical to the existing account ID and the existing password, the controller 160 may control the storage unit 130 to maintain the apparatus use information on the previous user. If the account ID and the password input through the user identification UI window 310 are not identical to the existing account ID and the existing password, the controller 160 may display the storage medium selection UI window including the information on the at least one storage medium.

Examples of the storage medium are, but not limited to, an HDD, a memory, and an engine memory. The storage medium may be an RAM, a flash memory, a ROM, an EPROM, an EEPROM, a register, a hard disk, a removable disk, a memory card, and an USB memory.

According to an exemplary embodiment, the image forming apparatus 100 determines whether a user is changed or not. If it is determined that the user is changed, the controller 160 may control the user interface unit 120 to display an item selection UI window including items of apparatus use information as illustrated in FIG. 5.

Figure 5:
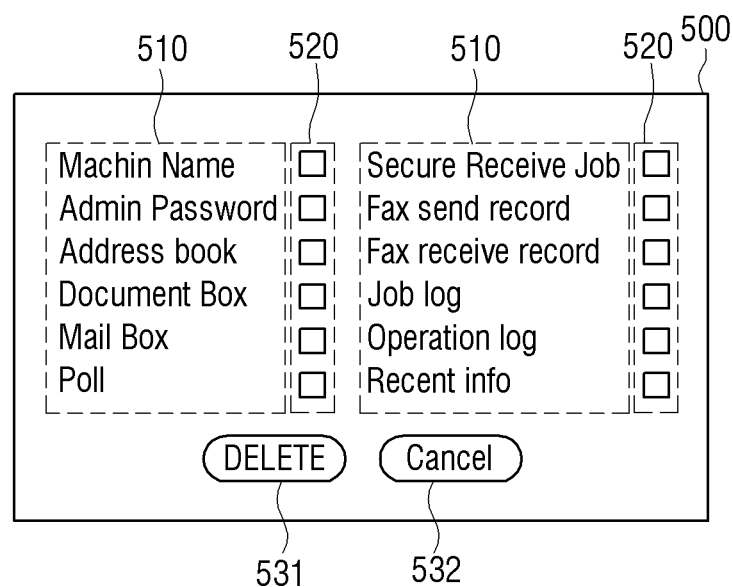

Referring to FIG. 5, an item selection UI window 500 includes items 510 of apparatus use information, an UI window 520 to select one of the items of the apparatus use information, and UI windows 531 and 532 to confirm whether the selected item will be deleted. If at least one item is selected through the item selection UI window 500, the controller 160 may control the storage unit 130 to delete apparatus use information corresponding to the selected item.

The controller 160 may display the item selection UI window 500 without displaying the UI window 210 to ask whether the user wants to delete the apparatus use information as shown in FIG. 2.

The controller 160 may control to display the UI window 210 to ask whether the user wants to delete the apparatus use information as illustrated in FIG. 2, and, if the YES selection UI window 211 in the UI window 210 is selected, the controller 160 may display the item selection UI window 500 including the items of the apparatus use information. If the NO selection UI window 212 in the UI window 210 is selected, the controller 160 may control the storage unit 130 to maintain the apparatus use information on the previous user.

If the account ID and the password input through the user identification UI window 310 shown in FIG. 3 are identical to the existing account ID and the existing password, the controller 160 may control the storage unit 130 to maintain the apparatus use information on the previous user. If the account ID and the password input through the user identification UI window 310 are not identical to the existing account ID and the existing password, the controller 160 may display the item selection UI window 500 including the items of the apparatus use information.

According to an exemplary embodiment, the image forming apparatus 100 may delete the apparatus use information regardless of whether the user is changed or not. This case is applied, if the existing user wants to delete his/her own apparatus use information before the image forming apparatus is leased to another user or before a user of the image forming apparatus is changed to another user.

More specifically, if a command to delete apparatus use information is input through the user interface unit 120, the controller 160 may delete the apparatus use information regardless of whether the user is changed or not.

If the command to delete the apparatus use information is input through the user interface unit 120, the controller 160 may control to display the user identification UI window 310 as shown in FIG. 3. If the account ID and the password input through the user identification UI window 310 are identical to an account ID and a password of a current user, the controller 160 may control the storage unit 130 to delete apparatus use information on the current user. If the account ID and the password input through the user identification UI window 310 are not identical to the existing account ID and the existing password, the controller 160 may control the storage unit 130 to maintain the apparatus use information.

If a command to delete the apparatus use information is input through the user interface unit 120, the controller 160 may control the user interface unit 120 to display the storage medium selection UI window including the information on the at least one storage medium, and, if the user selects a storage medium, the controller 160 may control the storage unit 130 to format the selected storage medium.

If a command to delete the apparatus use information is input through the user interface unit 120, the controller 160 may control the user interface unit 120 to display the item selection UI window including the items of the apparatus use information, and, if the user selects at least one item of the apparatus use information, the controller 160 may control the storage medium 130 to delete the selected apparatus use information.

According to the various exemplary embodiments described above, the method for managing the apparatus use information on the user and the job performance of the image forming apparatus is provided so that reliability in protecting information of the leased image forming apparatus can be improved.

Also, using the storage medium selection UI window including the information on the at least one storage medium or the item selection UI window including the items of the apparatus use information, the user can easily manage the apparatus use information on the user and the job performance of the image forming apparatus.

Figure 6:
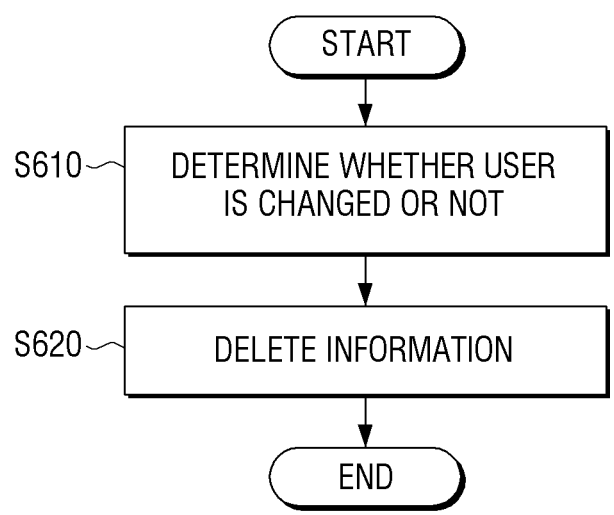
FIG. 6 is a flowchart illustrating a management method according to an exemplary embodiment of the present general inventive concept.

FIG. 6 is a flowchart illustrating a management method according to an exemplary embodiment of the present general inventive concept. Referring to FIG. 6, it is determined whether a user is changed or not at operation S610. A method of determining whether the user is changed will be explained in detail with reference to FIG. 7

If it is determined that the user is changed, apparatus use information on a previous user is deleted at operation S620.

Figure 7:
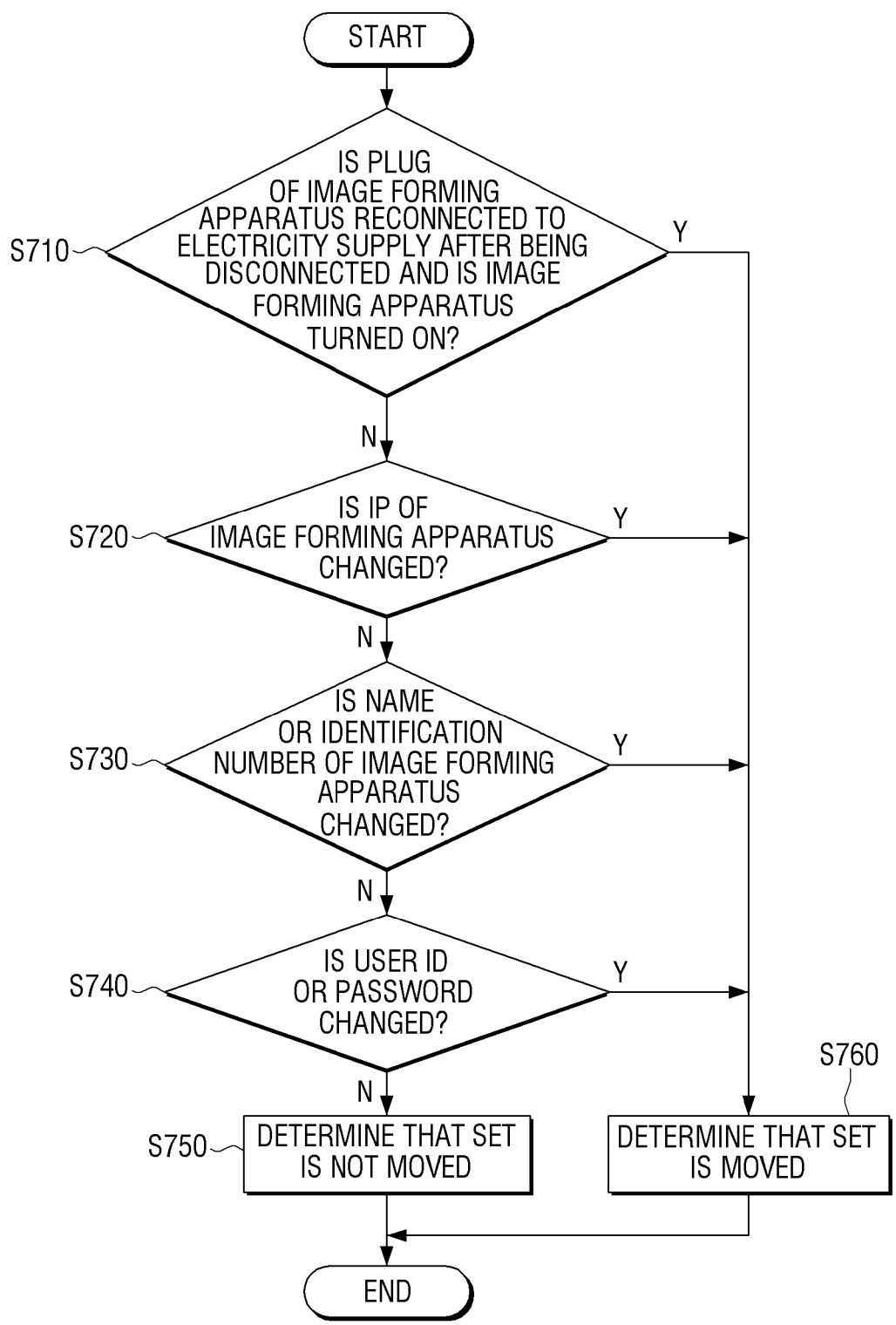
FIG. 7 is a flowchart illustrating a method of determining whether a user is changed or not according to an exemplary embodiment of the present general inventive concept.

FIG. 7 is a flowchart illustrating a method of determining whether a user is changed or not according to an exemplary embodiment of the present general inventive concept. Referring to FIG. 7, it is determined whether a plug of the image forming apparatus is reconnected to an electricity supply after being disconnected from the electricity supply such that the image forming apparatus is turned on at operation S710.

If the plug of the image forming apparatus is reconnected to the electricity supply after being disconnected from the electricity supply and the image forming apparatus is turned on at operation S710(Y), it is determined that the user is changed at operation S760. That is, it is determined that a set, for example, image forming apparatus, is moved.

It is determined that the user is changed if the plug of the image forming apparatus is reconnected to the electricity supply after being disconnected from the electricity supply and the image forming apparatus is turned on since it is common that the user turns on or off a switch while using the image forming apparatus, but may not disconnect and reconnect the plug to the electricity supply.

If the plug of the image forming apparatus is not reconnected to the electricity supply after being disconnected from the electricity supply and the image forming apparatus is not turned on at operation S710(N), it is determined whether an IP of the image forming apparatus is changed or not at operation S720.

If the IP of the image forming apparatus is changed at operation S720 (Y), it is determined that the user is changed or not at operation S760. That is, it is determined that the set (image forming apparatus) is moved.

If the IP of the image forming apparatus is not changed at operation S720 (N), it is determined whether a name or an identification number of the image forming apparatus is changed or not at operation S730.

If it is determined that the name or the identification number of the image forming apparatus is changed at operation S730 (Y), it is determined that the user is changed at operation S760. That is, it is determined that the set (image forming apparatus) is moved.

If it is not determined that the name or the identification number of the image forming apparatus is changed at operation S730 (N), it is determined whether a user ID or a password is changed or not at operation S740.

If it is determined that the user ID or the password is changed at operation S740 (Y), it is determined that the user is changed at operation S760. That is, it is determined that the set (image forming apparatus) is moved.

If it is not determined that the user ID or the password is changed at operation S740 (N), it is not determined that the user is changed at operation S750. That is, it is not determined that the set (image forming apparatus) is moved.

The reason that it is determined that the user is changed if at least one of the IP, the apparatus name, the identification number, the account ID, and the account password of the image forming apparatus is changed is, because it is common that the user rarely changes the IP, the apparatus name, the identification number, the account ID, and the account password of the image forming apparatus, while using the image forming apparatus, once they have been set.

Figure 8:
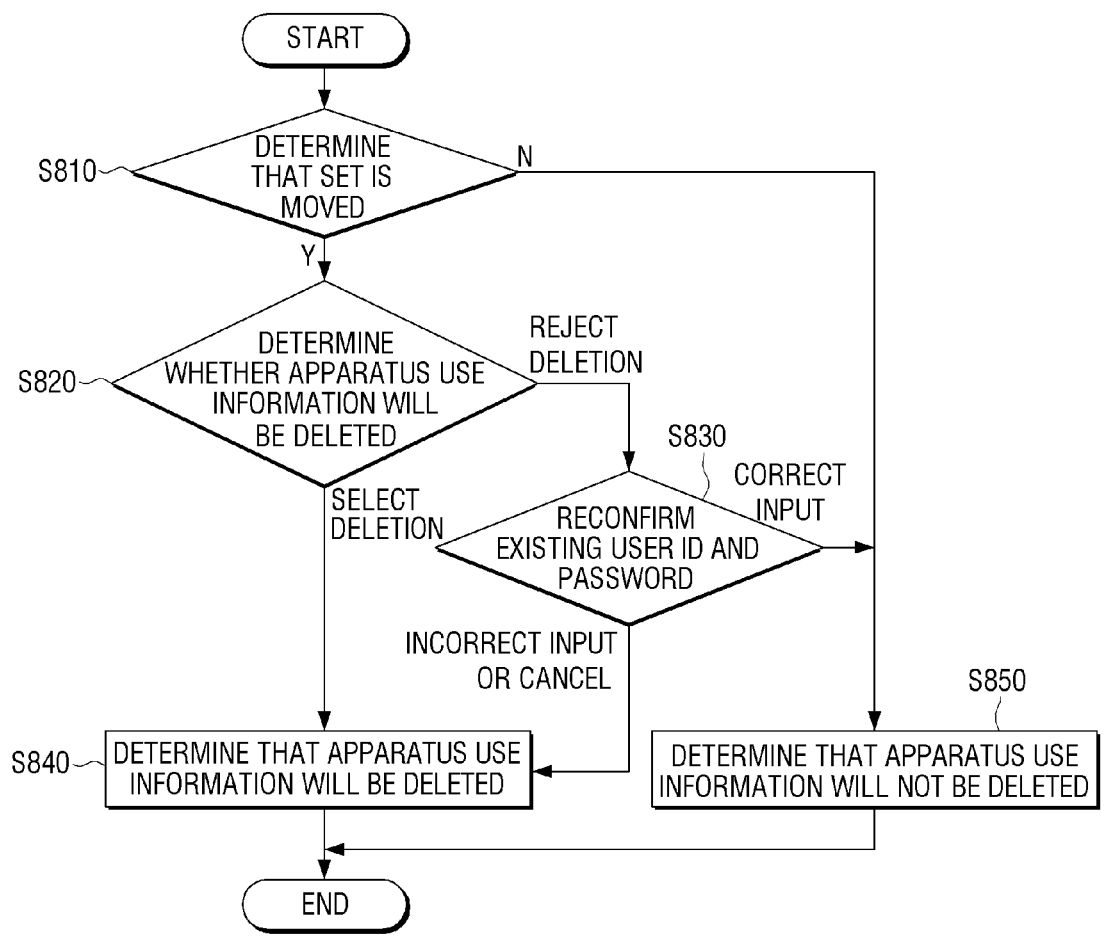
FIG. 8 is a flowchart illustrating a management method according to an exemplary embodiment of the present general inventive concept.

FIG. 8 is a flowchart illustrating a management method according to an exemplary embodiment of the present general inventive concept. Referring to FIG. 8, it is determined whether a user is changed or not at operation S810. That is, it is determined whether a set (image forming apparatus) is moved or not. The detailed method of determining has been described above with reference to FIG. 7 and thus an explanation thereof is omitted.

If it is not determined that the user is changed at operation S810 (N), it is determined that apparatus use information is not deleted at operation S850.

If it is determined that the user is changed at operation S810 (Y), it is determined whether a user wishes to delete the apparatus use information at operation S820.

If it is determined that the user wishes to delete the apparatus use information at operation S820 (select deletion), it is determined that the user apparatus information is deleted at operation S840.

If the user rejects deletion of the apparatus use information at operation S820 (reject deletion), an existing user ID and an existing password are reconfirmed at operation S830.

If the ID and the password of the existing user are correctly input at operation S830 (correct input), it is determined that the apparatus use information is not deleted at operation S850.

If the ID and the password of the existing user are not correctly input at operation S830 (incorrect input or cancel), it is determined that the apparatus use information is deleted at operation S840.

if the user is changed as an existing user is replaced with a new user due to leasing (that is, the user is changed as a set is changed) or if the user is changed without leasing (that is, only the user is changed without moving the set), the new user may be given authority to use the apparatus use information by the existing user. In this case, if the account ID and the password input through the user identification UI window 310 are identical to the existing account ID and the existing password, the apparatus use information is maintained so that unreasonable measures to the new user can be prevented.

The information management method according to the above-described exemplary embodiments may be realized by a program code stored in diverse types of recording media and executed by a CPU.

More specifically, the code to execute the above-described methods may be stored in diverse types of recording media readable by a terminal, such as a RAM, a flash memory, a ROM, an EPROM, an EEPROM, a register, a hard disk, a removable disk, a memory card, an USB memory, and a CD-ROM.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the above exemplary embodiments, the method for managing the apparatus use information on the user and the job performance of the image forming apparatus is provided so that reliability in protecting information of the leased image forming apparatus can be improved.

The user can easily manage the apparatus use information on the user and the job performance of the image forming apparatus using the UI window Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. An image forming apparatus comprising:
a memory to store data including image forming apparatus data and customer data of a first user; and
a user interface unit to receive a second user's request to delete a part of the stored data; and
a controller to delete the customer data from the memory in response to the second user's request.

2. The image forming apparatus as claimed in claim 1, wherein the data deleted by the second user's request comprises a username and a user's password.

3. The image forming apparatus as claimed in claim 1, further comprising: a communication interface to connect the image forming apparatus to an external apparatus through network communication.

4. The image forming apparatus as claimed in claim 1, the controller deletes the part of the stored data so as to make the part of the stored data permanently irretrievable from the memory.

5. The image forming apparatus as claimed in claim 1, wherein the receiving the second user's request comprises receiving identification information of the second user.

6. The image forming apparatus as claimed in claim 1, wherein the part of the stored data to be deleted is determined by a second user's selection.

7. The image forming apparatus as claimed in claim 1, wherein the image forming apparatus data comprises data related to at least one of an IP address of the image forming apparatus, an apparatus name of the image forming apparatus and an identification number of the image forming apparatus.

8. The image forming apparatus as claimed in claim 1, wherein the customer data comprises a username and a user's password.

9. A method of managing information of an image forming apparatus, the method comprising:
storing, in the image forming apparatus, data including image forming apparatus data and customer data of a first user;
receiving a second user's request to delete a part of the stored data; and
deleting the customer data from the image forming apparatus in response to the second user's request.

10. The method as claimed in claim 9, wherein the image forming apparatus data comprises data related to at least one of an IP address of the image forming apparatus, an apparatus name of the image forming apparatus and an identification number of the image forming apparatus.

11. The method as claimed in claim 9, wherein the part of the stored data to be deleted is determined by a second user's selection.

12. The method as claimed in claim 9, wherein the customer data consists of plurality of data, and
the deleting comprises, deleting the plurality of data from the image forming apparatus in response to the second user's request to delete the customer data being received.

13. The method as claimed in claim 9, wherein the data deleted by the second user's request comprises a username and a user's password.

14. The method as claimed in claim 9, wherein the deleting comprises deleting the part of the stored data so as to make the part of the stored data permanently irretrievable from the image forming apparatus.

15. The method as claimed in claim 9, wherein the receiving the second user's request comprises receiving identification information of the second user.

16. The method as claimed in claim 9, wherein the customer data comprises a user name and a user's password.

17. A non-transitory computer-readable medium containing computer-readable codes as a program to execute a method of managing information of an image forming apparatus, the method comprising:
storing, in the image forming apparatus, data including image forming apparatus data and customer data of a first user;
receiving a second user's request to delete a part of the stored data; and
deleting the customer from the image forming apparatus in response to the second user's request.

* * * * *